(12) United States Patent
Burrow et al.

(10) Patent No.: US 11,794,688 B2
(45) Date of Patent: Oct. 24, 2023

(54) VEHICLE SENSITIVE SEAT BELT RETRACTOR CONTROL WITH SUPPRESSED Z-AXIS SENSITIVITY

(71) Applicant: AUTOLIV ASP, INC., Ogden, UT (US)

(72) Inventors: Jon E. Burrow, Ortonville, MI (US); Matthew R. Schimento, Royal Oak, MI (US); Gunter Clute, Elmshorn (DE); Bryan Vanwambeke, Macomb, MI (US); Timothy P. Sherrow, Jr., Fenton, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 92 days.

(21) Appl. No.: 17/474,165

(22) Filed: Sep. 14, 2021

(65) Prior Publication Data

US 2023/0083728 A1    Mar. 16, 2023

(51) Int. Cl.
*B60R 22/40*   (2006.01)
(52) U.S. Cl.
CPC .................................... *B60R 22/40* (2013.01)
(58) Field of Classification Search
CPC ............ B60R 224/40; B60R 2022/401; B60R 2022/402
See application file for complete search history.

(56) References Cited

U.S. PATENT DOCUMENTS

| | | | | |
|---|---|---|---|---|
| 4,998,684 A | * | 3/1991 | Mori ...................... | B60R 22/40 242/384.6 |
| 5,622,383 A | * | 4/1997 | Kielwein ................ | B60R 22/40 297/479 |
| 8,770,507 B2 | * | 7/2014 | Evers ..................... | B60R 22/40 242/384.6 |
| 9,434,347 B2 | * | 9/2016 | Vanwambeke ......... | B60R 22/40 |

\* cited by examiner

*Primary Examiner* — Sang K Kim
(74) *Attorney, Agent, or Firm* — DICKINSON WRIGHT PLLC

(57) ABSTRACT

A vehicle sensitive retractor control system having reduced sensitivity to Z-axis acceleration experienced during normal driving. The retractor control system incorporates a rolling mass and a locking lever which, in a resting position, are arranged such that the locking lever does not engage a ratchet wheel of a seat belt retractor spool. In response to accelerations in the horizontal plane, the rolling ball mass becomes unseated from its resting position and allows the locking lever to rotate due to the position of its center of gravity relative to its pivot point allowing it to pivot and lock the retractor. In response to Z-axis acceleration, the rolling mass is prevented from contacting the locking lever by a mass restrictor.

5 Claims, 5 Drawing Sheets

VEHICLE SENSITIVE SEAT BELT RETRACTOR CONTROL WITH SUPPRESSED Z-AXIS SENSITIVITY

FIELD OF THE INVENTION

This invention relates to an automotive occupant restraint seat belt retractor, and particularly to a vehicle sensitive control system for such a retractor with reduced sensitivity to Z-axis acceleration.

BACKGROUND OF THE INVENTION

Motor vehicles are frequently equipped with active occupant restraint systems such as seat belt assemblies. Seat belt assemblies typically have a lap and shoulder belt portion for restraining the occupant in the event of an impact or rollover event. To enhance the comfort and convenience provided by the seat belt system, retractors are provided which allow the belt webbing to be freely paid-out and retracted when the vehicle is not subjected to unusual acceleration forces or inclination. In the event of exposure to such forces, a retractor control system activates to lock the retractor to prevent additional pay-out of webbing. Thus, the retractor locks in a manner to enable the seat belt webbing to restrain the occupant. Such retractor control systems take various forms. One category of such control systems is known as vehicle sensitive control systems. These systems are sensitive to acceleration forces acting on the vehicle, for example in the case of a frontal impact condition in which the vehicle experiences a high level deceleration load. Such devices also lock the retractor in the event of side impacts, rollovers, and when certain other forces act on the vehicle.

Another category of such retractor control systems is known as webbing sensitive control systems. These devices operate much in the manner of a centrifugal clutch and sense the rotational speed of the retractor spool, such that when extremely high angular accelerations of the retractor spool occurs associated with rapid pay-out of webbing, the control system engages to lock the retractor. This invention is related to an improved vehicle sensitive retractor control system.

As mentioned previously, vehicle sensitive retractor control systems must be sensitive to acceleration loads acting in various axes and planes. Primarily important are impacts to the vehicle creating acceleration loads acting in the horizontal plane, such as front, rear, or side impact conditions. However, if a rollover event has occurred, it is important that the retractor lock to restrain the occupant. Typical vehicle sensitive retractor control systems utilize a pendulum or rolling ball inertial mass to activate a locking lever which engages with a ratchet wheel of the retractor webbing spool. When acceleration loads act on the vehicle, the rolling ball mass or pendulum moves to urge a locking lever to engage with the ratchet wheel of the retractor spool, thus locking the spool from further pay-out of webbing. These devices have been utilized for many decades and have proven to be reliable and effective retractor control systems.

Designers of vehicle sensitive control systems attempt to design the systems such that they lock the retractor when necessary to restrain the occupant while minimizing locking during normal driving conditions (i.e. "nuisance locking"). Normal maneuvers of the vehicle, driving up and down inclines and over bumpy roads can produce forces causing a periodic locking of the retractor. Such periodic locking in normal driving conditions is undesirable from an occupant comfort viewpoint. The problems of unnecessary locking of retractors tend to be especially significant in heavy duty truck-type vehicles. These vehicles, due to their operating conditions, heavy loads, and suspension systems, tend to undergo significant jaunts and vertical displacements as they are driven, especially over uneven road surfaces. This motion creates accelerations in the Z-axis direction, defined as the vertical axis of the vehicle. Presently available vehicle sensitive retractor control systems generally produce undesirable locking due to normally encountered Z-axis accelerations, especially in heavy truck applications.

In view of the above, it is apparent that there exists a need for an improved retractor control system that is less sensitive to normally encountered Z-axis accelerations, especially adapted for heavy truck applications.

SUMMARY OF THE INVENTION

In satisfying the above need, as well as overcoming the enumerated drawbacks and other limitations of the related art, the present invention provides a vehicle sensitive retractor control system having intentionally reduced sensitivity to normally encountered Z-axis accelerations of a motor vehicle. The control system utilizes a rolling mass which, when displaced, allows a locking lever to lock a seat belt retractor. A mass restrictor is positioned to restrict the distance the mass may move upwardly along the Z-axis (i.e. vertically) when subject to Z-axis accelerations, preventing the mass from being displaced from the locking lever under such conditions. Locking of the locking lever with a ratchet wheel of the retractor locking system occurs when the inertial mass is displaced allowing the lever to rotate due to its weight balancing into engagement. The combination of the mass restrictor and the engagement system render the control system relatively insensitive to Z-axis accelerations. However, should the vehicle experience sufficient accelerations along the other axes, the mass is free to disengage from the locking lever, allowing locking of the retractor when necessary.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
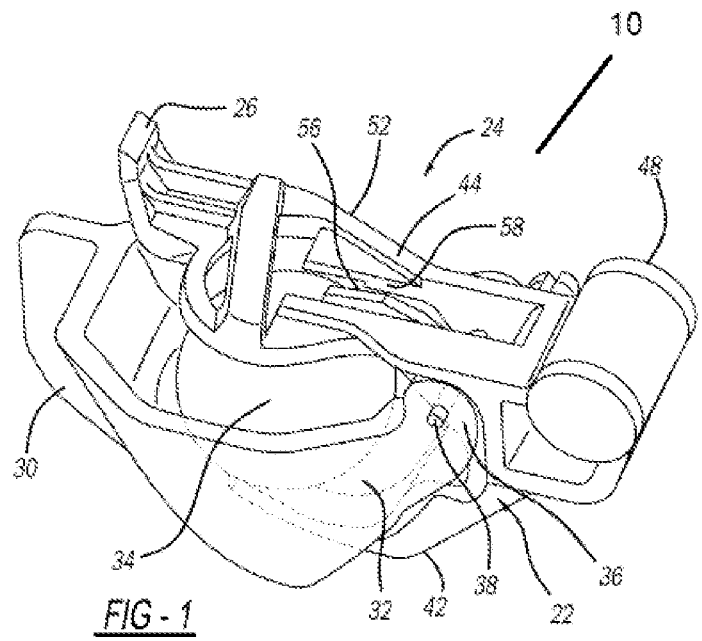
FIG. 1 is a perspective view of the inertial sensor assembly for a reduced Z-axis sensitivity heavy truck sensor (retractor control system)
Figure 4:
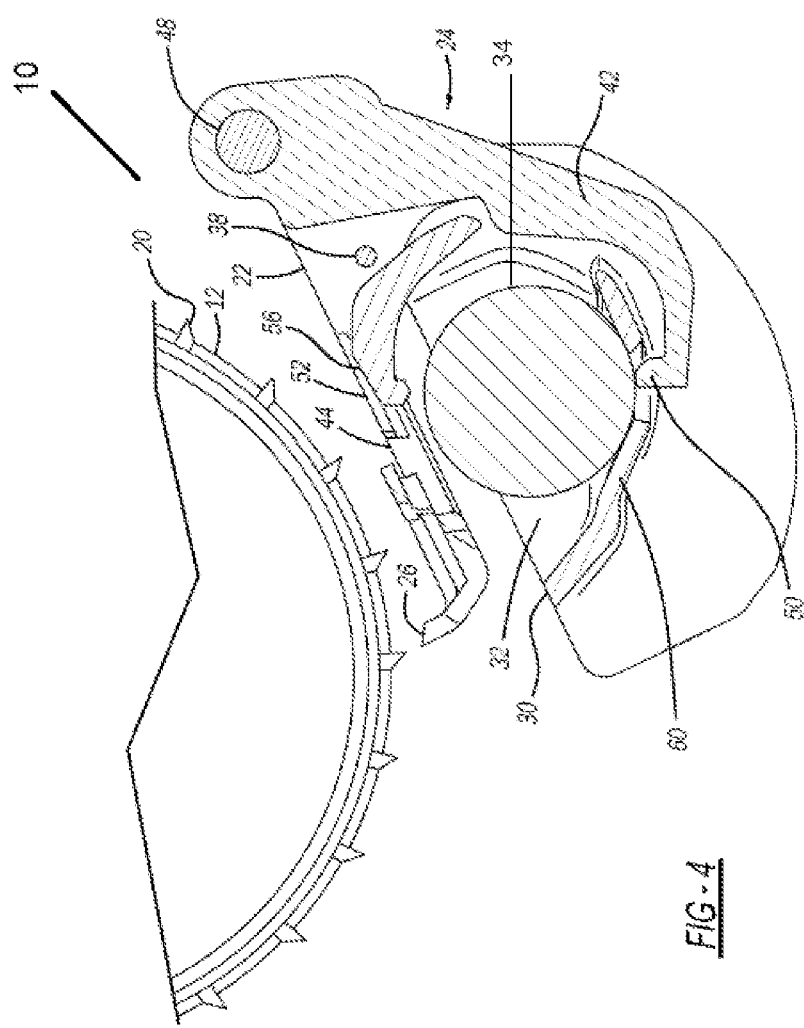
FIG. 4 is a side view of the inertial sensor assembly in a normal at rest condition.

A vehicle sensitive retractor control system in accordance with a first embodiment of this invention is shown in FIG. 1 and is identified by reference number 10. The retractor control system 10 is used with a ratchet wheel 12 (as shown in FIG. 4) which is part of a belt retractor having a rotating webbing spool (not shown) which rotates as seat belt webbing is extended from and retracted into the retractor during its normal operation. A torsion spring (not shown) acts on the webbing spool, urging it rotationally to pull the webbing into the retractor. Ratchet wheel 12 includes an array of teeth 20 around its perimeter. These teeth 20 engage with a locking lever (described below) to enable the control system to lock the webbing retractor spool under specific operating conditions. This is a common locking system used for many decades for inertial responsive retractor assemblies.

A principal component of the retractor control system 10 is inertial sensor assembly 24 which is responsive to inertial forces acting on the belt retractor and the vehicle to which it is mounted. Inertial sensor assembly 24 is provided to cause a locking of the retractor when the vehicle is subjected to certain acceleration forces or due to an inclination of the vehicle. As mentioned previously the retractor control system 10 is intentionally provided with features to make it relatively insensitive to accelerations acting in the Z-axis direction (i.e. vertical with respect to the associated vehicle).

Locking lever 22 of inertial sensor assembly 24 includes an upward projecting engagement finger 26 and is rotatable over a limited range of angular motion about axle 38 providing a pivot. When a predetermined acceleration force acts on inertial sensor assembly 24, locking lever 22 is allowed to lift, enabling engagement of engagement finger 26 with ratchet wheel teeth 20. This action in turn causes a locking bar to engage with perimeter teeth formed by a webbing spool in a well-known manner.

Figure 2:
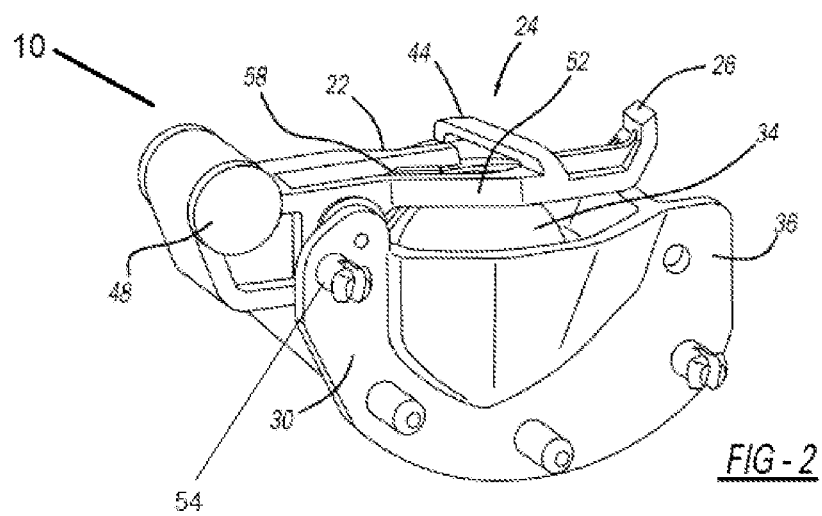
FIG. 2 is another perspective view of the inertial sensor assembly for the retractor control system shown in FIG. 1.
Figure 3:
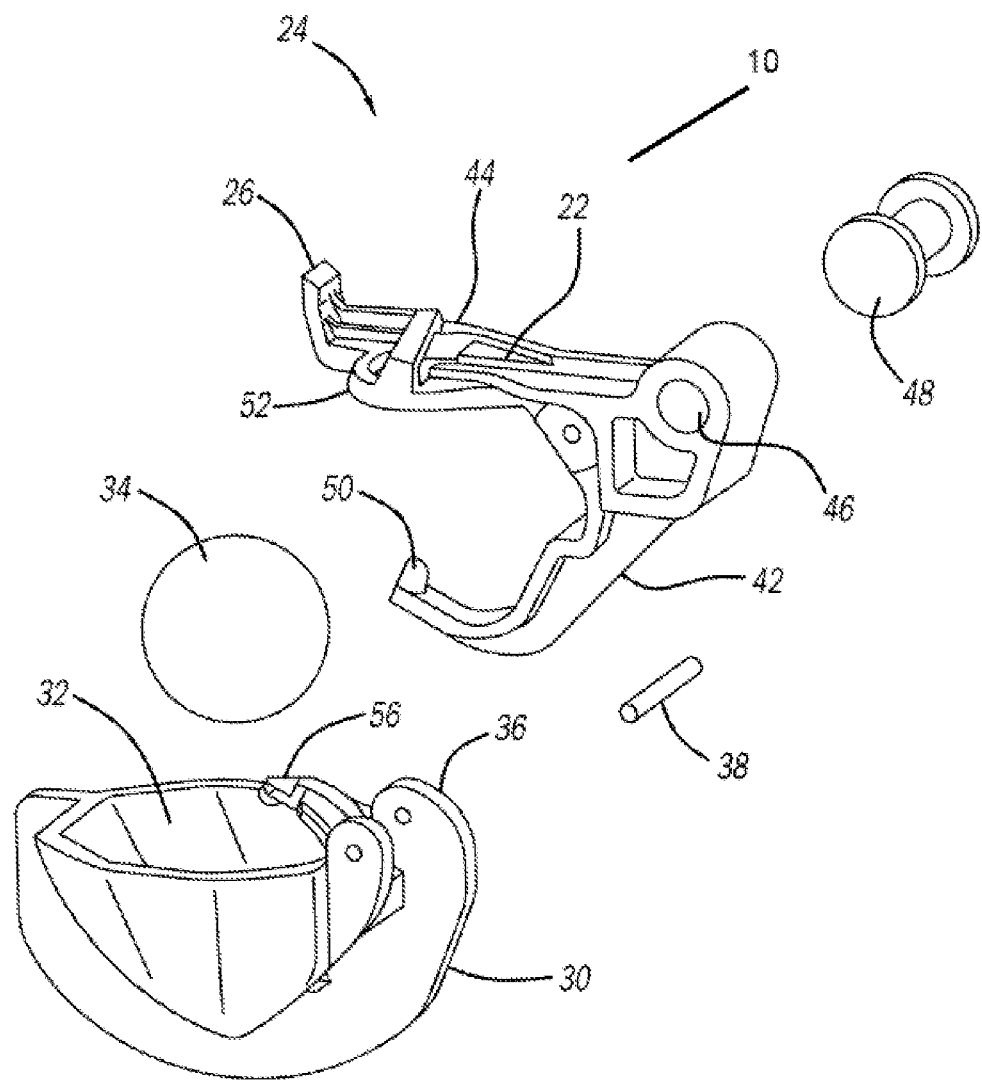
FIG. 3 is an exploded view of the inertial sensor assembly.

With particular reference to FIGS. 2 and 3, additional components of inertial sensor assembly 24 are described. Sensor housing 30 is adapted to be fixedly mounted to the frame of the associated belt retractor and forms nesting surface 32 for sensor ball 34. Retention features 54 enable attachment of housing 30 to the frame of the associated retractor. Sensor ball 34 is of a conventional configuration and is preferably formed of metal and in this case has a spherical shape. As will be explained in detail below, sensor ball 34 is permitted to move from a normal centered position within nesting surface 32 to positions displaced in both the X-axis (vehicle forward and aft), Y-axis (vehicle transverse), and to a limited extent in the Z-axis (vehicle upward and downward). Housing 30 further forms hinge mounts 36 which receive axle 38. Lever 22 forms a pair of arms including lower arm 42 and upper arm 44 which at its unsupported end forms engagement finger 26. Arms 42 and 44 form a caliper-like structure engageable with the upper and lower surfaces of sensor ball 34. Restrictor 56 is formed by housing 30 and has an arched shaped to engage the upper portion of sensor ball 34 in certain circumstances.

Lever 22 forms cavity 46 which receives counterweight 48. Lower arm 42 is shaped to wrap around sensor ball 34 and forms an upwardly projecting center post 50. Upper arm 44 forms engagement ring 52, and as mentioned previously has a distal end with an upwardly oriented engagement finger 26. Counterweight 48 may be provided as a separate component shown here as a dumbbell shaped component which may be installed into cavity 46, or the counterweight may be insert molded in a fixed position within cavity 46. Upper arm 42 forms slot 58 which allows it to be position such that restrictor 56 fits within the slot, allowing lever 22 to rotate over a limited angular range without interference with restrictor 56.

Figure 5:
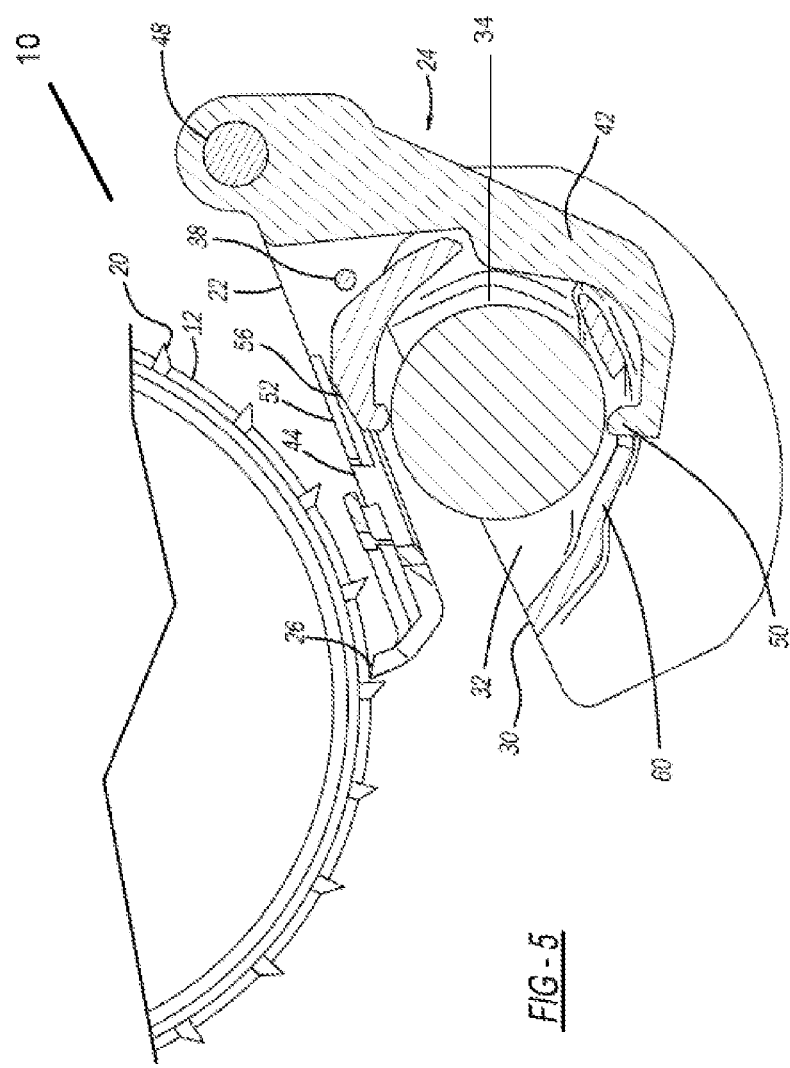
FIG. 5 is the control system of FIG. 1 subject to an upward Z-axis acceleration.
Figure 6:
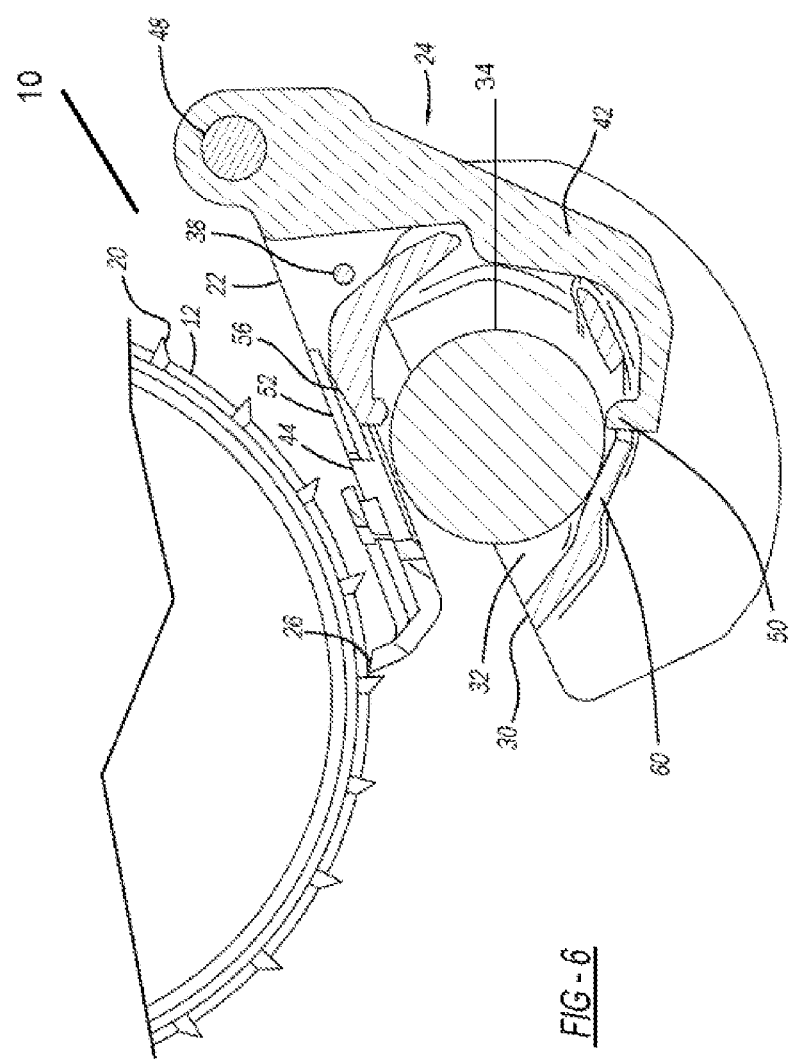
FIG. 6 is the control system of FIG. 1 subject to a forward X-axis acceleration.

Now with reference to FIGS. 4, 5 and 6, operation of the retractor control system 10 is described. FIG. 4 illustrates a normal operating condition for the retractor control system 10 in which external inertial forces above a predetermined level are not acting on the sensor and the vehicle is in a normal level orientation. In this condition, sensor ball 34 is seated in nesting surface 32 at a central location, resting at the perimeter of circular aperture 60. In this position, center post 50 protrudes through aperture 60 to assume the position shown in FIG. 4. Lever 22 is balanced as such that its center of gravity (CG) is to the right of its axis of rotation about axle 38 (as the system is depicted in FIGS. 4, 5 and 6). In other words, as these components are illustrated by the mentioned Figures, lever 22 is urged to rotate in a clockwise direction but is prevented from doing so by the interaction between sensor ball 34 and center post 50. FIG. 4 also illustrates that restrictor 56 is positioned to form a gap relative to the upper vertically facing surface of sensor ball 34. Restrictor 56 is provided to interact with sensor ball 34 in response to Z-axis accelerations. Thus sensor ball 34 is permitted to move vertically to a limited extent, which determines the level of sensitivity to such accelerations.

FIG. 5 illustrates the condition of the inertial sensor elements when the unit is exposed to a Z-axis acceleration (upward or downward with respect to the associated vehicle). This condition is illustrated as exceeding a predetermined threshold of Z-axis acceleration in which sensor ball 34 contacts restrictor 56. In this condition the interaction between the sensor ball and lower arm center post 50 is relieved and the gravity forces acting on lever 22 cause the lever to rotate in the clockwise direction, causing engagement between engagement finger 26 and ratchet wheel teeth 20 thereby locking the retractor.

FIG. 6 illustrates a condition in which inertial sensor assembly 24 is subjected to a forward deceleration (X-axis) such as a frontal impact of the associated vehicle or a braking maneuver causing acceleration above a predetermined level. In this condition, sensor ball 34 shifts in the left-hand direction as the parts are shown in the figures and thus lifts off the center portion of nesting surface 32. This allows clockwise rotation of locking lever 22 leading to the As mentioned previously, the retractor control system 10 is intentionally designed to be relatively insensitive to accelerations in the vertical Z-axis. However, the end of the ball restrictor 56 in contact with sensor ball 34 may be shaped to urge the ball mass 42 into contact with the locking lever upper arm 44 when the vehicle is in an inverted orientation. For example, an angled, pointed or rounded shape may be provided. Thus, when the vehicle is inverted sensor ball 34 will tend to roll off the ball restrictor 56 and contact locking lever 22 causing it to engage with ratchet wheel 12.

Thus in operation of inertial sensor assembly 24, when inertial forces are subjected to belt retractor 14 in a manner that is desired to cause engagement sensor ball 34 disengages with locking lever 22 which allows it to rotate due to its weight biasing to and engagement condition. Thus the position of sensor ball 34 serves to forcibly retain locking lever 22 in a disengaged condition, or escapes from contact with the sensor lever to allow it to engage due to its normal bias to rotate into engagement.

While the above description constitutes the preferred embodiment of the present invention, it will be appreciated that the invention is susceptible to modification, variation and change without departing from the proper scope and fair meaning of the accompanying claims.

The invention claimed is:

1. A vehicle sensitive seat belt retractor control system for locking a vehicle seat belt retractor in the event of acceleration loads acting on the retractor in a horizontal plane while having a reduced sensitivity to acceleration loads acting in a Z-axis direction, perpendicular to the horizontal plane, the control system engaging with a toothed ratchet wheel rotatable with a spool of the retractor, the control system comprising:

a sensor ball,
      a housing forming a nesting surface for the sensor ball and allowing the sensor ball to move from a normal resting position to a displaced position, the housing nesting surface forming a lower aperture and having an upper restrictor engageable with the sensor ball upon a vertical displacement of the sensor ball,
      a locking lever pivotable about a pivot, the locking lever having an upper arm and a lower arm, the upper arm forming an engagement finger for causing engagement with the ratchet wheel to arrest rotation of the spool upon a displacement of the locking lever from a disengaged position to an engagement position, the locking lever having a center of gravity positioned relative to the pivot such that the locking lever is biased toward the engagement position with the ratchet wheel, the lower arm forming a center post engageable with a lower surface of the sensor ball and engaging the sensor ball through the housing lower aperture, and
   whereby the sensor ball is displaceable from the normal resting position to the displaced position in response to acceleration loads acting in the horizontal plane and in the Z-axis direction, the sensor ball engaging the locking lever lower arm center post while in the normal resting position urging the locking lever to remain in the disengaged position, wherein when acceleration loads of a defined direction and magnitude act on the sensor ball, the sensor ball moves to the displaced position, disengaging with the locking lever and allowing the locking lever to rotate to the engagement position in response to the acceleration loads and the upper restrictor restricts the sensor ball from moving to the displaced position and contacting the locking lever in response to acceleration loads acting in the Z-axis direction.

2. The vehicle sensitive retractor control system according to claim 1 wherein the upper restrictor includes an end shaped to urge the sensor ball to move off of the upper restrictor and to contact the locking lever and move it to the engagement position when the vehicle is in an inverted condition.

3. The vehicle sensitive retractor control system according to claim 2 wherein the end has an angled shape.

4. The vehicle sensitive retractor control system according to claim 1 wherein the position of the center of gravity of the locking lever is horizontally displaced from the pivot.

5. The vehicle sensitive retractor control system according to claim 4 wherein the locking lever center of gravity is positioned relative to the pivot on a side of the locking lever opposite the side of the locking lever forming the engagement finger.

* * * * *